(12) United States Patent
Hagiwara et al.

(10) Patent No.: US 8,211,246 B2
(45) Date of Patent: Jul. 3, 2012

(54) PERMANENT MAGNET AND MOTOR AND GENERATOR USING THE SAME

(75) Inventors: Masaya Hagiwara, Yokohama (JP); Shinya Sakurada, Tokyo (JP); Yosuke Horiuchi, Tokyo (JP); Keiko Okamoto, Kawasaki (JP); Tsuyoshi Kobayashi, Kawasaki (JP); Shiori Kaji, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/049,518

(22) Filed: Mar. 16, 2011

(65) Prior Publication Data

US 2012/0075046 A1 Mar. 29, 2012

(30) Foreign Application Priority Data

Sep. 24, 2010 (JP) ................ P2010-214425

(51) Int. Cl.
*H01F 1/055* (2006.01)
(52) U.S. Cl. .............. 148/303; 148/101; 148/103
(58) Field of Classification Search .............. None
See application file for complete search history.

(56) References Cited

U.S. PATENT DOCUMENTS

| 2002/0036031 | A1* | 3/2002 | Sakaki et al. | 148/301 |
|---|---|---|---|---|
| 2002/0054825 | A1* | 5/2002 | Sukaki et al. | 420/83 |
| 2007/0051431 | A1* | 3/2007 | Sakaki et al. | 148/105 |
| 2009/0261774 | A1 | 10/2009 | Yuuki et al. | |

FOREIGN PATENT DOCUMENTS

| EP | 2 048 772 A1 | 4/2009 |
|---|---|---|
| JP | 60-218445 | 11/1985 |
| JP | 62-243731 | 10/1987 |
| JP | 1-179302 | 7/1989 |
| JP | 4-308053 | 10/1992 |
| JP | 2008-29148 | 2/2008 |
| JP | 2008-43172 | 2/2008 |

* cited by examiner

*Primary Examiner* — John Sheehan
(74) *Attorney, Agent, or Firm* — Oblon, Spivak, McClelland, Maier & Neustadt, L.L.P.

(57) ABSTRACT

In one embodiment, a permanent magnet has a composition represented by $(Sm_{1-x}R_x)(Fe_pM_qCu_rCo_{1-p-q-r})_z$, where R is at least one element selected from Nd and Pr, M is at least one element selected from Ti, Zr and Hf, and $0.22 \leq p \leq 0.45$, $0.005 \leq q \leq 0.05$, $0.01 \leq r \leq 0.1$, $0.05 \leq x < 0.5$, and $7 \leq z \leq 9$. The permanent magnet includes a $Th_2Zn_{17}$ crystal phase as a main phase, and a ratio of diffraction peak intensity $I_{(113)}$ from a (113) plane of the $Th_2Zn_{17}$ crystal phase in powder X-ray diffraction to diffraction peak intensity $I_{(300)}$ from a (300) plane in powder X-ray diffraction is in a range of $0.9 \leq I_{(113)}/I_{(300)} \leq 1.7$.

17 Claims, 2 Drawing Sheets

PERMANENT MAGNET AND MOTOR AND GENERATOR USING THE SAME

CROSS-REFERENCE TO RELATED APPLICATION

This application is based upon and claims the benefit of priority from Japanese Patent Application No. 2010-214425, filed on Sep. 24, 2010; the entire contents of which are incorporated herein by reference.

FIELD

Embodiments described herein related generally to a permanent magnet and a motor and a generator using the same.

BACKGROUND

As a high-performance permanent magnet, rare earth magnets such as Sm—Co magnets and Nd—Fe—B magnets are known. The rare earth magnets which are currently produced contain large amounts of Fe, Co, and the like, which contribute largely to increase in saturation magnetization. The rare earth magnets achieve large magnetic an isotropy which originates from behaviors of 4f electrons of rare earth elements such as Sm and Nd in a crystal field. The rare earth magnets thereby achieve high coercive force. Such high performance magnets are used in electronic equipment such as various motors, generators, speakers, measurement apparatuses.

DETAILED DESCRIPTION

Figure 1:
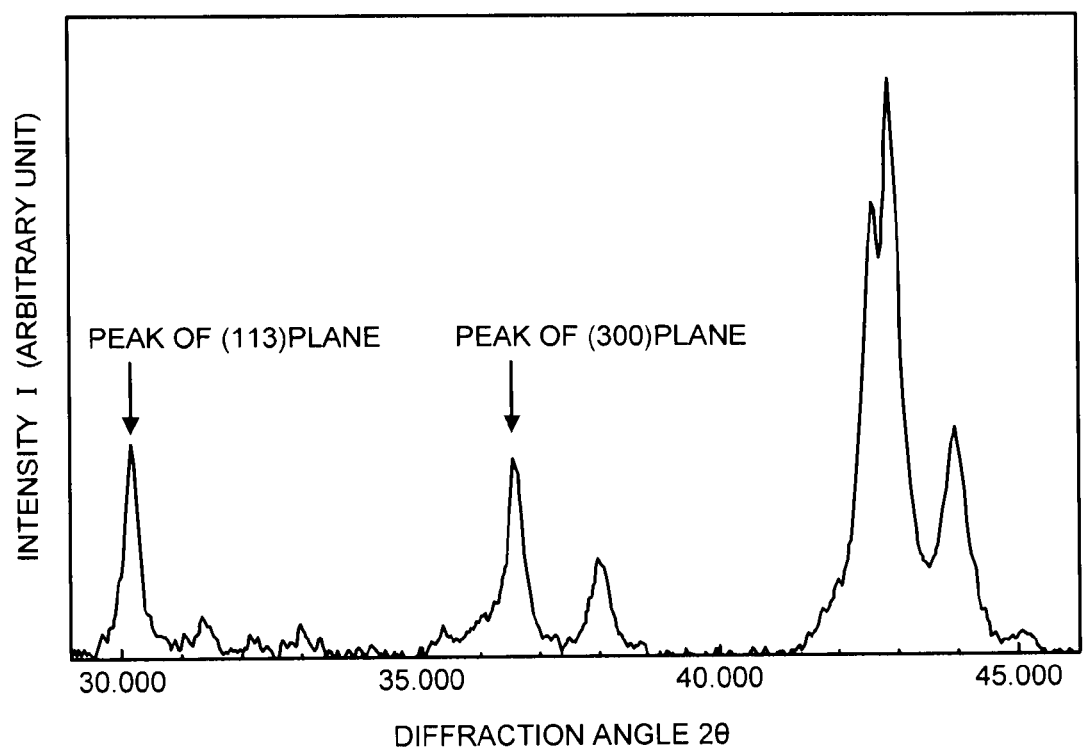
FIG. 1 is a diagram illustrating an example of an X-ray diffraction pattern of a permanent magnet according to an embodiment.

According to one embodiment, there is provided a permanent magnet having a composition represented by a composition formula:

$$(Sm_{1-x}R_x)(Fe_p M_q Cu_r Co_{1-p-q-r})_z \quad (1)$$

where, R is at least one element selected from Nd and Pr, M is at least one element selected from Ti, Zr, and Hf, p is a number (atomic ratio) satisfying $0.22 \leq p \leq 0.45$, q is a number (atomic ratio) satisfying $0.005 \leq q \leq 0.05$, r is a number (atomic ratio) satisfying $0.01 \leq r \leq 0.1$, x is a number (atomic ratio) satisfying $0.05 \leq x < 0.5$, and z is a number (atomic ratio) satisfying $7 \leq z \leq 9$. The permanent magnet comprises a $Th_2Zn_{17}$ crystal phase as a main phase. When diffraction peak intensity from a (113) plane of the $Th_2Zn_{17}$ crystal phase is $I_{(113)}$ and diffraction peak intensity from a (300) plane is $I_{(300)}$ in powder X-ray diffraction, the permanent magnet satisfies that a ratio of the $I_{(113)}$ to the $I_{(300)}$ is $0.9 \leq I_{(113)}/I_{(300)} \leq 1.7$.

Demands for size and weight reduction as well as low power consumption in various electrical equipment using permanent magnets are increasing, and improvement in performance of permanent magnets is desired for meeting such demands. Specifically, permanent magnets with an improved maximum energy product (BHmax) which exhibit higher performance are demanded. Moreover, nowadays, in use of permanent magnets in a motor for hybrid vehicles (HEV) and electric vehicles (EV), increase in heat resistance of permanent magnets is demanded.

In motors for HEV and EV, currently, Nd—Fe—B magnets are mainly used. High heat resistance is needed in such use, and thus (Nd, Dy)—Fe—B magnets are used, in which part of neodymium (Nd) is replaced with dysprosium (Dy) to increase coercive force. Since Dy is one of rare earth elements, permanent magnets not using Dy are desired for wide popularization of motors for HEV and EV. In this aspect, Sm—Co magnets are known for that they have good heat resistance without using Dy.

The Sm—Co magnets have a problem of small magnetization as compared to the Nd—Fe—B magnets. Accordingly, there are desired Sm—Co magnets with higher magnetization. In a Sm—Co magnet, it is possible to improve magnetization by replacing a part of Sm with Nd and/or Pr having high magnetic moment. However, when a part of Sm is replaced with Nd and/or Pr, magnetic anisotropy decreases from their form of 4f electron orbits, which makes them difficult to exert coercive force. Thus, there is desired a technique to allow exertion of coercive force while increasing the amount to be replaced with Nd and/or Pr.

Among the Sm—Co magnets, $Sm_2Co_{17}$ type magnets are known as high performance magnets. The $Sm_2Co_{17}$ type magnet has a two-phase separated structure, and is considered to exert coercive force by pinning of a domain wall in a crystal grain boundary occurred in two-phase separation. Such $Sm_2Co_{17}$ type magnet is a magnet in which a metallic structure has a quite large effect on characteristics. The permanent magnet in the embodiment is made possible to exert coercive force while maintaining high magnetization, as a result of studying metallic structures of alloys in which a part of Sm is replaced with Nd and/or Pr.

The permanent magnet of the embodiment will be described. The permanent magnet of the embodiment has a composition represented by the formula (1). The permanent magnet contains samarium (Sm) and at least one element R selected from neodymium (Nd) and praseodymium (Pr) as rare earth elements. Furthermore, as transition elements other than rare earth elements, the permanent magnet contains iron (Fe), at least one element M selected from titanium (Ti), zirconium (Zr), and hafnium (Hf), copper (Cu), and cobalt (Co).

(Samarium (Sm) and Element R)

Sm brings about large magnetic anisotropy in the permanent magnet, and is an effective element for giving high coercive force. When the content (total amount) of Sm and element R is too small, a large amount of α-Fe phase separates out and high coercive force cannot be obtained. On the other hand, when the content (total amount) of Sm and element R is too large, saturation magnetization decreases. Accordingly, Sm and element R are contained so that a z value indicating the atomic ratio of total amount of Fe, element M, Cu, and Co to the total amount of Sm and element R is in the range of 7 to 9 (the range of the content of Sm and element R is 10 atomic % to 12.5 atomic %). It is more preferred that the z value be in the range of 7.5 to 8.5.

The element R is an effective element for improving magnetization. When the content of element R is too small, effect for improving magnetization cannot be obtained sufficiently. The saturation magnetization improves when the content of element R is increased, but when the content of element R is too large, magnetic anisotropy and coercive force decrease. Accordingly, the x value indicating the atomic ratio of element R to the total amount of Sm and element R is set to the range of 0.05≦x≦0.5. More preferably, the amount (x) of element R is in the range of 0.1≦x≦0.45, further preferably in the range of 0.2≦x≦0.4.

A part of Sm may be replaced with at least one element X selected from yttrium (Y), lanthanum (La), cerium (Ce), erbium (Er), terbium (Tb), and dysprosium (Dy). By replacing a part of Sm with element X, costs and so on for purification can be reduced, which is industrially advantageous. However, when the amount of Sm replaced with element X is too large, it is possible that the magnetic characteristics decrease. Accordingly, the amount of Sm replaced with element X is preferably 50 atomic % or less of Sm. More preferably, the amount of Sm replaced with element X is 40 atomic % or less, further preferably 30 atomic % or less.

(Iron (Fe))

Fe is an element which mainly bears magnetization of the permanent magnet. When the content of Fe is too small, effect of improving magnetization of the permanent magnet cannot be expected. The saturation magnetization of the permanent magnet improves when the content of Fe is increased, but when the content of Fe is too large, coercive force may decrease by separating out of α-Fe phase, or the like. Therefore, the p value indicating the atomic ratio of Fe to the total amount of Fe, Co, Cu, and element M is set in the range of 0.22≦p≦0.45. More preferably, the amount (p) of Fe is in the range of 0.26≦p≦0.45, further preferably in the range of 0.28≦p≦0.45.

(Element M)

The element M is at least one element selected from titanium (Ti), zirconium (Zr), and hafnium (Hf). The element M is an effective element for exerting high coercive force in a composition with a large amount of Fe. When the content of element M is too small, effect of improving coercive force cannot be expected. On the other hand, when the content of element M is too small, magnetization may decrease. Accordingly, the q value indicating the atomic ratio of element M to the total amount of Fe, Co, Cu and element M is set in the range of 0.005≦q≦0.05. More preferably, the amount (q) of M is in the range of 0.015≦q≦0.04, further preferably in the range of 0.015≦q≦0.35.

The element M may be any one of Ti, Zr, and Hf, but preferably contains at least Zr. More preferably, 50 atomic % or more of the element M is Zr. By having the element M with 50 atomic % or more of Zr, effect of increasing coercive force of the permanent magnet improves further. Hf in element M is particularly expensive, and thus it is preferred that the amount of using Hf be small. Industrially it is preferred that the content of Hf be less than 20 atomic % of element M.

(Copper (Cu))

Cu is an effective element for allowing the permanent magnet to exhibit high coercive force. When the Cu content is too small, it is difficult to attain high coercive force. On the other hand, when the Cu content is too large, magnetization may decrease. Accordingly, the r value indicating the atomic ratio of Cu to the total amount of Fe, Co, Cu and element M is set in the range of 0.01≦r≦0.1. More preferably, the amount (r) of Cu is in the range of 0.02≦r≦0.1, further preferably in the range of 0.03≦r≦0.08.

(Cobalt (Co))

Co is an element which bears magnetization of the permanent magnet, and is effective for allowing the magnet to exert high coercive force. Further, by containing a large amount of Co, Curie temperature of the permanent magnet becomes high, and thermal stability of magnetic characteristics can be improved. When the Co content is too small, the aforementioned effect cannot be expected. On the other hand, when the Co content is too large, the Fe content decreases relatively, and thus it may cause decrease in magnetization.

A part of Co may be replaced with at least one element A selected from nickel (Ni), vanadium (V), chrome (Cr), manganese (Mn), aluminum (Al), silicon (Si), gallium (Ga), niobium (Nb), tantalum (Ta), and tungsten (W). The element A contributes to improvement of magnetic characteristics, for example, coercive force. However, excessive replacement of Co with element A may cause decrease in magnetization, and thus the amount of replacing Co with element A is preferably 20 atomic % or less. More preferably, the amount of replacing Co with element A is 18 atomic % or less, further preferably 15 atomic % or less.

The composition of the permanent magnet can be measured by ICP (inductively coupled plasma) spectrometry. The permanent magnet allows containing inevitable impurities such as oxide.

The permanent magnet of the embodiment has a structure in which the $Th_2Zn_{17}$ crystal phase (crystal phase having a $Th_2Zn_{17}$ structure/2-17 phase) is a main phase. A permanent magnet in which the $Th_2Zn_{17}$ crystal phase is a main phase can obtain high magnetic characteristics such as high coercive force. The main phase means a phase with a largest volume ratio among phases such as a crystal phase and an amorphous phase constituting the permanent magnet. Preferably, the volume ratio of the $Th_2Zn_{17}$ crystal phase (main phase) is 50% or more.

Other than the $Th_2Zn_{17}$ crystal phase as the main phase, preferably, the composition of the permanent magnet contains a $CaCu_5$ crystal phase (crystal phase having a $CaCu_5$ structure/1-5 phase). Preferably, the permanent magnet has a fine structure in which two-phases of the $Th_2Zn_{17}$ crystal phase (2-17 phase) and the $CaCu_5$ crystal phase (1-5 phase) are separated. Thus, high magnetic characteristics can be obtained. Here, although containing phases other than these two phases is not excluded, note that preferably the structure of the permanent magnet is substantially formed of the two phases, the $Th_2Zn_1$ crystal phase and the $CaCu_5$ crystal phase.

The volume ratios of respective phases (alloy phases) forming the structure of the permanent magnet are determined comprehensively by using observation with an electron microscope or optical microscope and X-ray diffraction or the like together, and can be obtained by an area analysis method with a transmission electron microscope picture imaging a cross-section (hard axis plane) of the permanent magnet. The cross-section of the permanent magnet is taken along a substantially center portion of a surface having the maximum area in magnet surfaces.

Furthermore, in the permanent magnet of the embodiment, the ratio of diffraction peak intensity $I_{(113)}$ from the (113) plane to diffraction peak intensity $I_{(300)}$ from the (300) plane of the $Th_2Zn_{17}$ crystal phase in powder X-ray diffraction is in the range of $0.9 \leq I_{(113)}/I_{(300)} \leq 1.7$. By having the peak intensity ratio $I_{(113)}/I_{(300)}$ in the range of 0.9 to 1.7, the permanent magnet having the composition represented by the formula (I) can be made to exert large coercive force. Therefore, it is possible to provide a high-performance permanent magnet with high magnetization. That is, it becomes possible to achieve coercive force of 300 kA/m or higher while residual magnetization in the Sm—Co permanent magnet with excellent heat resistance is 1.15 or higher.

When the peak intensity ratio $I_{(113)}/I_{(300)}$ of the $Th_2Zn_{17}$ crystal phase in the powder X-ray diffraction is too low, sufficient coercive force as a permanent magnet cannot be exerted. In other words, by making the peak intensity ratio $I_{(113)}/I_{(300)}$ of 0.9 or more, the permanent magnet can be made to exert favorable coercive force, in which magnetization is improved by replacing a part of Sm with Nd and/or Pr having large magnetic moment. However, when the peak intensity ratio $I_{(113)}/I_{(300)}$ is too high, it causes decrease in magnetization. Preferably, the peak intensity ratio $I_{(113)}/I_{(300)}$ is in the range of $0.95 \leq I_{(113)}/I_{(300)} \leq 1.6$, more preferably in the range of $1 \leq I_{(113)}/I_{(300)} \leq 1.5$.

A specific method of measurement on the permanent magnet by the powder X-ray diffraction is as follows. First, the permanent magnet (when used in a product, the magnet separated from this product) is demagnetized by an alternating current magnetic field. The magnet in a state of being demagnetized or a part thereof is pulverized to obtain a powder with a mean particle diameter of about 10 μm. The obtained powder is filled in a sample holder by a sufficient amount so that a sample plane on which X-rays are to be incident becomes flat. Using such a sample, X-ray diffraction is carried out.

The measurement is performed by a θ-2θ method of powder X-ray diffraction. CuKα rays are used as X-rays. The sampling angle is 0.04 degree or less, and the scanning speed is 2 degrees or less per minute. From integral intensity obtained by performing the X-ray diffraction under such conditions, data from which a background is subtracted by lines approximated by straight lines located at both ends of measurement data is assumed as desired diffraction peak intensity.

FIG. 1 illustrates an example of X-ray diffraction pattern of the permanent magnet. As illustrated in FIG. 1, the diffraction peak from the (113) plane of the $Th_2Zn_{17}$ crystal phase appears when the diffraction angle 2θ is in the vicinity of 30 degrees. The intensity of this diffraction peak is assumed as $I_{(113)}$. The diffraction peak from the (300) plane of the $Th_2Zn_{17}$ crystal phase appears when the diffraction angle 2θ is in the vicinity of 37 degrees. The intensity of this diffraction peak is assumed as $I_{(300)}$. The diffraction peak intensity ratio $I_{(113)}/I_{(300)}$ is calculated from such diffraction peak intensity $I_{(113)}$ from the $I_{(113)}$ plane and diffraction peak intensity $I_{(300)}$ from the (300) plane.

Next, a method for producing the permanent magnet of this embodiment will be described. The method for producing the permanent magnet described here is an example, and the method for producing the permanent magnet of this embodiment is not limited thereto. First, an alloy powder containing predetermined amounts of respective elements is prepared. The alloy powder is basically prepared so as to satisfy the composition represented by the above-described formula (1).

The alloy powder is prepared by making an alloy thin band in a flake shape by a strip casting method or the like, and pulverizing this thin band. Using the strip casting method, for example, a molten alloy is injected onto a chill roll rotating at a circumferential speed of 0.1 m/sec to 20 m/sec, to thereby obtain a thin band sequentially solidified with a thickness of 1 mm or less. When the circumferential speed of the chill roll is lower than 0.1 m/sec, dispersion of the composition can easily occur in the thin band. When the circumferential speed of the chill roll is over 20 m/sec, the crystal grains are refined to the size of a single magnetic domain or smaller, and favorable magnetic characteristics cannot be obtained. The circumferential speed of the chill roll preferably ranges from 0.3 m/sec to 1.5 m/sec, more preferably from 0.5 m/sec to 12 m/sec.

The alloy powder having the composition represented by the formula (1) may be prepared by pulverizing an alloy ingot obtained by casting molten metal, which is prepared by melting an alloy material by an arc melting method or high frequency melting method. Other methods for preparing the alloy powder include mechanical alloying method, mechanical grinding method, gas atomizing method, reduction diffusion method, and the like. Pulverization of the alloy is performed using a jet mill, ball mill, or the like. To prevent oxidization of the alloy powder, it is preferred that the pulverization be performed in an inert gas atmosphere or in an organic solvent such as ethanol. The alloy powder obtained in this manner or the alloy before being pulverized may be subjected to heat treatment as necessary to homogenize it.

Next, the alloy powder is filled in a metal mold placed in a magnetic field created by an electromagnet or the like, and is pressure forming is performed while applying the magnetic field, thereby making a green compact in which the crystal axis of the alloy powder is oriented. The green compact is sintered under the condition of temperatures of 1100° C. to 1300° C. for 0.5 hour to 15 hours, thereby obtaining a fine sintered compact. Preferably, sintering of the green compact is performed in vacuum or an inert gas atmosphere of argon gas, or the like to prevent oxidation.

When the sintering temperature of the green compact is too low, density of the sintered compact decreases. On the other hand, when the sintering temperature is too high, Sm and so on in the alloy powder evaporate and favorable magnetic characteristics cannot be obtained. Accordingly, the sintering temperature is preferably in the above-described range, more preferably in the range of 1150° C. to 1250° C., further preferably in the range of 1180° C. to 1230° C. When the sintering time is too short, the density of the sintered compact may become uneven. On the other hand, when the sintering time is too long, Sm and so on in the alloy powder evaporate and favorable characteristics cannot be obtained. Accordingly, the sintering time is preferably in the above-described range, more preferably in the range of 1 hour to 10 hours, further preferably in the range of 1 hour to 4 hours.

Next, solution heat treatment and aging heat treatment are performed on the obtained sintered compact to control the crystal structure. The solution heat treatment is performed for obtaining a structure in which $Th_2Zn_{17}$ crystal phase (2-17 phase) is the main phase, and is performed for further obtaining a $TbCu_7$ crystal phase (1-7 phase) which is a precursor of a structure in which the $Th_2Zn_{17}$ crystal phase (2-17 phase) and the $CaCu_5$ crystal phase (1-5 phase) are separated in phase. Preferably, the heat treatment temperature for solution treatment is in the range of 1130° C. to 1230° C., and preferably the heat treatment time is in the range of 0.5 hour to 8 hours.

When the solution heat treatment temperature is too low, the ratio of the 1-7 phase cannot be increased sufficiently, and favorable magnetic characteristics cannot be obtained. When the solution heat treatment temperature is too high, the ratio of the 1-7 phase decreases, and favorable magnetic characteristics cannot be obtained. Accordingly, the solution heat treatment temperature is preferably in the above-described range. More preferably, the solution heat treatment temperature is in the range of 1150° C. to 1210° C., further preferably in the range of 1160° C. to 1190° C. By performing the solution heat treatment at such temperatures, the 1-7 phase with high Fe concentration can be obtained efficiently.

Further, when the solution heat treatment time is too short, the structure phase easily becomes uneven. On the other hand, when the solution heat treatment time is too long, Sm and so on in the sintered compact evaporate, and favorable characteristics may not be obtained. Accordingly, the solution heat treatment time is preferably in the above-described range. More preferably, the solution heat treatment time is in the range of 1 hour to 8 hours, further preferably in the range of 1 hour to 4 hours. To prevent oxidation and the like of the sintered compact, preferably the solution heat treatment is performed in vacuum or in an inert gas atmosphere of argon gas, or the like.

Next, the aging heat treatment is performed on the sintered compact after being solution heat treated. The aging heat treatment is performed for separating the 1-7 phase as a precursor into the 2-17 phase and the 1-5 phase. The heat treatment temperature for aging is preferably in the range of 700° C. to 900° C., and the heat treatment time is preferably in the range of 0.5 hour to 20 hours. After the aging heat treatment is performed, the sintered compact is preferably cooled slowly to 400° C., and subsequently, it is preferably cooled slowly to the room temperature. Preferably, the aging heat treatment is performed in vacuum or an inert gas atmosphere of argon gas, or the like to prevent oxidation and the like of the sintered compact. Preferably, the slow cooling after the aging heat treatment is performed at a cooling rate in the range of 0.5° C. to 5° C./minute.

When the aging heat treatment temperature is either too low or conversely too high, a homogenous mixed phase of the 2-17 phase and the 1-5 phase cannot be obtained. Accordingly, the aging heat treatment temperature is preferably in the above-described range. More preferably, the aging heat treatment temperature is in the range of 750° C. to 900° C., further preferably in the range of 800° C. to 850° C. When the aging heat treatment time is too short, separation of the 1-7 phase into the 2-17 phase and the 1-5 phase cannot be completed. On the other hand, when the aging heat treatment time is too long, crystal grains become coarse and magnetic characteristics decrease. Accordingly, the aging heat treatment time is preferably in the above-described range. More preferably, the aging heat treatment time is in the range of 1 hour to 15 hours, further preferably in the range of 5 hours to 10 hours.

In the permanent magnet of the embodiment, the ratio $I_{(113)}/I_{(300)}$ of the diffraction peak intensity $I_{(113)}$ from the (113) plane of the $Th_2Zn_{17}$ crystal phase to the diffraction peak intensity $I_{(300)}$ from the (300) plane thereof is set high. The peak intensity ratio $I_{(113)}/I_{(300)}$ varies depending on the state of the structure after the aging heat treatment. For example, when the ratio of presence of the grain boundary phase represented by the 1-5 phase increases, the value of the peak intensity ratio $I_{(113)}/I_{(300)}$ increases. To increase the ratio of presence of the grain boundary phase, it is preferred that an approach to increase the amount of Cu, decrease the solution heat treatment temperature, or the like be selected. The peak intensity ratio $I_{(113)}/I_{(300)}$ varies also depending on the alloy composition of the permanent magnet. Also by increasing the ratio of the element M in the alloy composition, the value of the peak intensity ratio $I_{(113)}/I_{(300)}$ can be increased.

The permanent magnet of this embodiment is preferably used for a permanent magnet motor or a generator for example. The permanent magnet motor (generator) excels in efficiency compared to conventional induction motors (generators), and has advantages such as achieving size reduction and noise reduction. Thus, the permanent magnet motor is gaining popularity widely as a drive motor (generator) for railway vehicles, hybrid vehicles (HEVs), electric vehicles (EVs), and the like. By employing the permanent magnet of this embodiment in the permanent magnet motor, generator, or the like, it is possible to achieve high efficiency, size reduction, and cost reduction. Further, since the permanent magnet of the embodiment is based on Sm—Co, it also excels in heat resistance.

Figure 2:
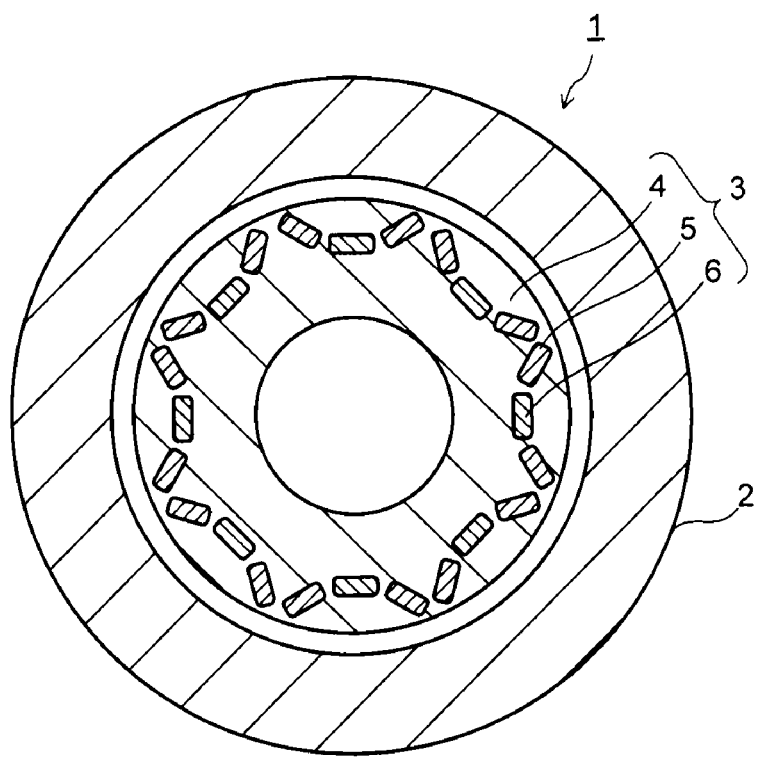
FIG. 2 is a view illustrating a variable magnetic flux motor of the embodiment.
Figure 3:
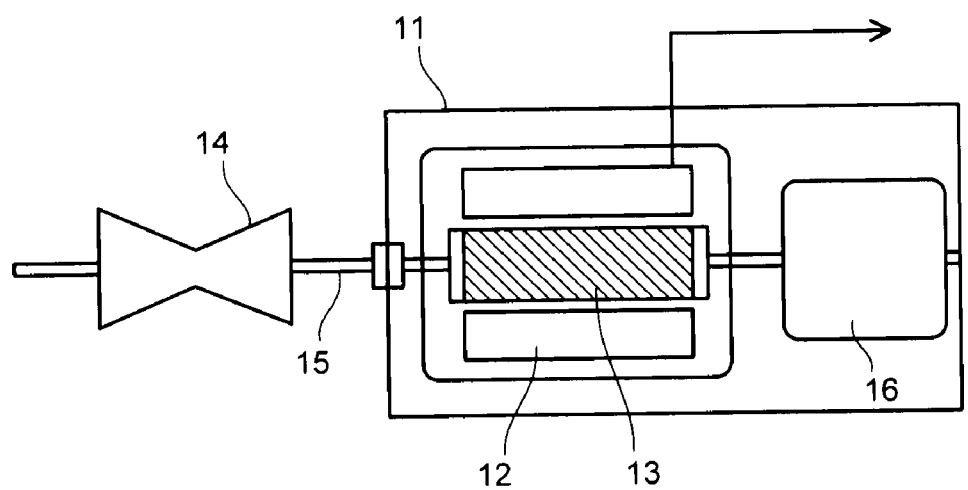
FIG. 3 is a diagram illustrating a variable magnetic flux generator of the embodiment.

Next, the permanent magnet motor and the generator of this embodiment will be described with reference to the drawings. FIG. 2 illustrates a variable magnetic flux motor of the embodiment. FIG. 3 illustrates a variable magnetic flux generator of the embodiment. The permanent magnet of the embodiment is preferred for a magnet of the variable magnetic flux motor and the variable magnetic flux generator, but application to an ordinary permanent magnet motor or generator is not restricted. For the structure and the drive system of the variable magnetic flux motor, techniques disclosed in JP-A 2008-29148 (KOKAI) and JP-A 2008-43172 (KOKAI) can be applied.

The variable magnetic flux motor is capable of outputting large torque with a small device size, and is preferable as a drive motor for hybrid vehicles (HEVs), electric vehicles (EVs), and the like, for which it is demanded to achieve small size and high power. The variable magnetic flux motor 1 illustrated in FIG. 2 includes a stator 2 and a rotor 3 disposed in the stator 2. In an iron core 4 in the rotor 3, there are disposed a stationary magnet 5 to which the permanent magnet of the embodiment is applied, and a variable magnet 6 to which the permanent magnet of the embodiment, with lower coercive force than the stationary magnet, is applied.

In the permanent magnet of the embodiment, by changing various conditions of the above-described producing method, the stationary magnet 5 having coercive force of 200 kA/m or higher and the variable magnet 6 having coercive force of 160 kA/m or lower can be obtained for example. It is possible to change the magnetic flux density (magnetic flux amount) of the variable magnet 6. The variable magnet 6 has a magnetization direction orthogonal to a Q-axis direction, and hence is not affected by Q-axis current and can be magnetized by D-axis current. In the rotor 3, a magnetized winding (not illustrated) is provided, and it is structured that application of current from a magnetization circuit to this magnetized winding cause the magnetic field thereof to directly act on the variable magnet 6.

In the variable magnetic flux motor 1 of this embodiment, application of the permanent magnet of the embodiment to the stationary magnet 5 and so on allows achieving more efficiency, size reduction, and cost reduction. In the variable magnetic flux motor 1 illustrated in FIG. 2, the permanent magnet of the embodiment is used for both of the stationary magnet 5 and the variable magnet 6, but the permanent magnet of the embodiment may be used for one of the magnets.

The variable magnetic flux generator 11 illustrated in FIG. 3 includes a stator 12 using the permanent magnet of the embodiment. A rotor 13 disposed in the stator 12 is connected to a turbine 14 provided on one end of the variable magnetic flux generator 11 via a shaft 15. The turbine 14 is structured to rotate by fluid supplied from an outside part for example. In addition, instead of using the turbine 14 rotated by fluid, it is also possible to rotate the shaft 15 by transmitting dynamic rotation such as regenerated energy of a vehicle. For the stator 12 and the rotor 13, various publicly known structures may be employed.

The shaft 15 is in contact with a commutator (not illustrated) disposed on the other side of the turbine 16 with respect to the rotor 13, and electromotive force generated by rotation of the rotor 13 is increased to system voltage via an isolated phase bus and a main transformer (not illustrated) and transmitted as output of the variable magnetic flux generator 11. In the rotor 13, charging by static electricity from the turbine 14 and charging by shaft current accompanying power generation occur, and thus the variable magnetic flux generator 11 has a brush 16 for discharging the charge on the rotor 13. In the variable magnetic flux generator 11 of the embodiment, since the permanent magnet of the embodiment is applied to the stator 12, more efficiency, size reduction, and cost reduction can be achieved.

Next, examples and evaluation results thereof will be described.

EXAMPLE 1

Respective materials were weighed to prepare a composition $(Sm_{0.7}Nd_{0.3})(Fe_{0.29}Zr_{0.02}Cu_{0.05}Co_{0.64})_{8.2}$, and thereafter arc melted in an Ar gas atmosphere to make an alloy ingot. The alloy ingot was heat treated in the Ar gas atmosphere under the condition of 1170° C.×1 hour, subsequently coarsely grinded in a mortar, and further pulverized in a jet mill, thereby preparing an alloy powder having a grain diameter of 10 μm or less. This alloy powder was pressed under a pressure of 3 MPa in a magnetic field of 2 T (tesla), thereby making a green compact (press molded body).

Next, the green compact was sintered in an Ar gas atmosphere under the condition of 1190° C.×3 hours, and subsequently heat treated in the Ar gas atmosphere under the condition of 1150° C.×5 hours, thereby making a sintered compact. Then, the sintered compact after the heat treatment was retained in the Ar gas atmosphere at 830° C. for four hours, and subsequently cooled slowly to 600° C. at a cooling rate of 1.2° C./minute, thereby obtaining a sintered magnet as a target. The heat treatment after sintering was performed for the solution heat treatment, and the heat treatment thereafter was performed for aging heat treatment. The sintered magnet obtained in this manner was subjected to characteristic evaluation, which will be described later.

EXAMPLES 2 TO 4

Sintered magnets were made similarly to the example 1, except that alloy powders having compositions illustrated in Table 1 are used. The sintered magnets obtained in this manner were subjected to the characteristic evaluation, which will be described later.

EXAMPLE 5

Respective materials were weighed to prepare a composition $(Sm_{0.6}Nd_{0.4})(Fe_{0.32}Zr_{0.03}Cu_{0.05}Co_{0.6})_{7.5}$, and thereafter arc melted in an Ar gas atmosphere to make an alloy ingot. This alloy ingot was set in a nozzle made of quartz and melted by high frequency induction heating, and subsequently the molten alloy was tilt-poured onto a chill roll rotating at a circumferential speed of 0.6 m/second and solidified sequentially, thereby making a thin band. This thin band was coarsely grinded and subsequently pulverized by a jet mill, thereby preparing an alloy powder having a grain diameter of 10 μm or less. This alloy powder was pressed under a pressure of 3 MPa in a magnetic field of 2 T, thereby making a green compact (press molded body).

Next, the green compact was sintered in the Ar gas atmosphere under the condition of 1200° C.×1 hour, and subsequently heat treated in the Ar gas atmosphere under the condition of 1160° C.×4 hours, thereby making a sintered compact. Next, the sintered compact after the heat treatment was retained in the Ar gas atmosphere at 850° C. for 1.5 hour, subsequently retained at 875° C. for four hours, and then slowly cooled to 450° C. at a cooling rate of 1.3° C./minute, thereby obtaining a sintered magnet as a target. The sintered magnet obtained in this manner was subjected to the characteristic evaluation, which will be described later.

EXAMPLES 6 TO 9

Sintered magnets were made similarly to the example 5, except that alloy powders having alloy compositions described in Table 1 are used. The sintered magnets obtained in this manner were subjected to the characteristic evaluation, which will be described later.

COMPARATIVE EXAMPLE 1

An alloy powder having the alloy composition described in Table 1 was used to make a green compact similarly to the example 1. This green compact was sintered in an Ar gas atmosphere under the condition of 1200° C.×3 hours, and subsequently heat treated in the Ar gas atmosphere under the condition of 1180° C.×3 hours, thereby making a sintered compact. The obtained sintered compact was retained in the Ar gas atmosphere at 850° C. for four hours, and thereafter cooled slowly to 600° C. at a cooling rate of 1.2° C./minute. The obtained sintered magnet was subjected to the characteristic evaluation, which will be described later.

COMPARATIVE EXAMPLE 2

An alloy powder having the alloy composition described in Table 1 was used to make a green compact similarly to the example 5. This green compact was sintered in an Ar gas atmosphere under the condition of 1210° C.×1 hour, and subsequently heat treated in the Ar gas atmosphere under the condition of 1180° C.×4 hours, thereby making a sintered compact. The obtained sintered compact was retained in the Ar gas atmosphere at 830° C. for 1.5 hour, subsequently retained at 870° C. for four hours, and thereafter cooled slowly to 450° C. at a cooling rate of 1.3° C./minute. The obtained sintered magnet was subjected to the characteristic evaluation, which will be described later.

COMPARATIVE EXAMPLES 3 AND 4

Respective materials were weighed to prepare compositions as described in comparative examples 3 and 4 of Table 1, and thereafter arc melted in an Ar gas atmosphere to make an alloy ingot. The alloy ingot was pulverized in a jet mill, thereby preparing an alloy powder having a grain diameter of 10 μm or less. The alloy powder was pressed under a pressure of 3 MPa in a magnetic field of 2 T, thereby making a green compact (press molded body). The green compact was sintered in the Ar gas atmosphere under the condition of 1190° C.×3 hours, and subsequently heat treated in the Ar gas atmosphere under the condition of 1150° C.×3 hours, thereby making a sintered compact. Then, the sintered compact after the heat treatment was retained in the Ar gas atmosphere at 830° C. for four hours, and subsequently cooled slowly to 600° C. at a cooling rate of 1.2° C./minute. The obtained sintered magnet was subjected to the characteristic evaluation, which will be described later.

TABLE 1

| | Magnet composition (atomic ratio) |
|---|---|
| Example 1 | $(Sm_{0.7}Nd_{0.3})(Fe_{0.29}Zr_{0.02}Cu_{0.05}Co_{0.64})_{8.2}$ |
| Example 2 | $(Sm_{0.6}Nd_{0.4})(Fe_{0.29}Zr_{0.02}Cu_{0.05}Co_{0.64})_{7.5}$ |
| Example 3 | $(Sm_{0.8}Pr_{0.2})(Fe_{0.3}Zr_{0.03}Cu_{0.07}Co_{0.6})_{8.0}$ |
| Example 4 | $(Sm_{0.8}Nd_{0.2})(Fe_{0.3}(Ti_{0.1}Zr_{0.9})_{0.04}Cu_{0.06}Co_{0.60})_{8.2}$ |
| Example 5 | $(Sm_{0.6}Nd_{0.4})(Fe_{0.32}Zr_{0.03}Cu_{0.05}Co_{0.6})_{7.5}$ |
| Example 6 | $(Sm_{0.8}Pr_{0.2})(Fe_{0.3}(Ti_{0.2}Zr_{0.8})_{0.035}Cu_{0.06}Co_{0.605})_{7.7}$ |
| Example 7 | $(Sm_{0.6}Y_{0.1}Nd_{0.3})(Fe_{0.28}Zr_{0.03}Cu_{0.05}Co_{0.64})_{7.5}$ |
| Example 8 | $(Sm_{0.6}Pr_{0.1}Nd_{0.3})(Fe_{0.28}Zr_{0.03}Cu_{0.05}Co_{0.64})_{8.0}$ |
| Example 9 | $(Sm_{0.6}Nd_{0.4})(Fe_{0.28}Zr_{0.03}Cu_{0.05}Co_{0.61}Mn_{0.03})_{8.0}$ |
| Comparative Example 1 | $(Sm_{0.7}Nd_{0.3})(Fe_{0.29}Zr_{0.02}Cu_{0.03}Co_{0.66})_{8.2}$ |

TABLE 1-continued

| | Magnet composition (atomic ratio) |
|---|---|
| Comparative Example 2 | $(Sm_{0.6}Nd_{0.4})(Fe_{0.32}Zr_{0.015}Cu_{0.05}Co_{0.615})_{7.5}$ |
| Comparative Example 3 | $(Sm_{0.7}Nd_{0.3})(Fe_{0.29}Zr_{0.02}Cu_{0.05}Co_{0.64})_{8.2}$ |
| Comparative Example 4 | $(Sm_{0.8}Nd_{0.2})(Fe_{0.25}(Ti_{0.4}Hf_{0.2}Zr_{0.4})_{0.04}Cu_{0.06}Co_{0.65})_{8.0}$ |

On the sintered magnets of Examples 1 to 9 and Comparative Examples 1 to 4, powder X-ray diffraction was performed to obtain the ratio ($I_{(113)}/I_{(300)}$) of the diffraction peak intensity $I_{(113)}$ from the (113) plane of the $Th_2Zn_{17}$ crystal phase and the diffraction peak intensity $I_{(300)}$ from the (300) plane thereof. Further, the coercive force and the residual magnetization of each sintered magnet were measured. Results of these measurements are illustrated in Table 2. The structure phases of each of the sintered magnets were checked by an area analysis method using a transmission electron microscope picture imaging a cross-section (hard axis plane) of each magnet, and it was confirmed that the $Th_2Zn_{17}$ crystal phase is the main phase in all of the sintered magnets.

The peak intensity ratio ($I_{(113)}/I_{(300)}$) of the $Th_2Zn_{17}$ crystal phase in the powder X-ray diffraction was obtained as follows. First, the magnetic sample was pulverized to obtain a powder having a mean grain diameter of approximately 10 μm, and subsequently the diffraction peak was measured with an XRD apparatus (made by RIGAKU, model number: RINT-1000). At this time, Cu was used for a vacuum tube, and CuKα ray with tube voltage of 40 kV and tube current of 40 mA is used. The sampling angle was 0.020 degree, and the scanning speed was twice per minute. The X-ray diffraction pattern of the example 1 is illustrated in FIG. 1. Further, the coercive force and the residual magnetization were measured with a BH tracer (device name: Magnetic Hysteresis Loop Tracer made by YOKOGAWA, model number: 3257).

TABLE 2

| | X-ray diffraction peak ratio [$I_{(113)}/I_{(300)}$] | Magnetic characteristics | |
|---|---|---|---|
| | | Coercive force Hcj[kA/m] | Residual magnetization Mr[T] |
| Example 1 | 1.15 | 400 | 1.24 |
| Example 2 | 1.13 | 380 | 1.21 |
| Example 3 | 1.16 | 450 | 1.20 |
| Example 4 | 1.15 | 400 | 1.21 |
| Example 5 | 1.11 | 350 | 1.25 |
| Example 6 | 1.08 | 300 | 1.21 |
| Example 7 | 1.15 | 500 | 1.19 |
| Example 8 | 1.00 | 320 | 1.22 |
| Example 9 | 1.09 | 320 | 1.21 |
| Comparative Example 1 | 0.75 | 100 | 1.24 |
| Comparative Example 2 | 0.77 | 130 | 1.25 |
| Comparative Example 3 | 0.76 | 100 | 1.24 |
| Comparative Example 4 | 0.75 | 110 | 1.15 |

As is clear from Table 2, the sintered magnets of Examples 1 to 9 all have the peak intensity ratio ($I_{(113)}/I_{(300)}$) in the range of 0.9 to 1.7. As a result, the sintered magnets of the examples have coercive force of 300 kA/m or higher, and further has large residual magnetization of 1.15 T or higher. On the other hand, the sintered magnets of Comparative Examples 1 to 4 have the peak intensity ratio ($I_{(113)}/I_{(300)}$) less than 0.9, and it can be seen that their coercive force is small accordingly, compared to the examples.

EXAMPLE 10

When the permanent magnets of Examples 1 to 9 were used in the permanent magnet motor (variable magnetic flux motor) illustrated in FIG. 2, it was possible to further achieve high efficiency, size reduction, and cost reduction compared to conventional motors.

EXAMPLE 11

When the permanent magnets of Examples 1 to 9 were used in the generator illustrated in FIG. 3, it was possible to further achieve high efficiency, size reduction, and cost reduction compared to conventional generators.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A permanent magnet comprising a composition represented by a composition formula:

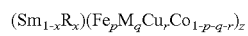

$(Sm_{1-x}R_x)(Fe_pM_qCu_rCo_{1-p-q-r})_z$ where, R is at least one element selected from Nd and Pr, M is at least one element selected from Ti, Zr, and Hf, p is a number (atomic ratio) satisfying $0.22 \leq p \leq 0.45$, q is a number (atomic ratio) satisfying $0.005 \leq q \leq 0.05$, r is a number (atomic ratio) satisfying $0.01 \leq r \leq 0.1$, x is a number (atomic ratio) satisfying $0.05 \leq x \leq 0.5$, z is a number (atomic ratio) satisfying $7 \leq z \leq 9$, wherein the permanent magnet comprises a $Th_2Zn_{17}$ crystal phase as a main phase, wherein a ratio of $I_{(113)}$ to $I_{(300)}$ is in a range of $0.9 \leq I_{(113)}/I_{(300)} \leq 1.7$, where the $I_{(113)}$ is a diffraction peak intensity from a (113) plane of the $Th_2Zn_{17}$ crystal phase in powder X-ray diffraction of the permanent magnet, and the $I_{(300)}$ is a diffraction peak intensity from a (300) plane of the $Th_2Zn_{17}$ crystal phase in the powder X-ray diffraction.

2. The permanent magnet according to claim 1, wherein 50 atomic % or more of the element M is Zr.

3. The permanent magnet according to claim 2, wherein coercive force of the permanent magnet is 300 kA/m or higher and residual magnetization of the permanent magnet is 1.15 T or higher.

4. The permanent magnet according to claim 1, wherein a part of the Sm is replaced with at least one element selected from Y, La, Ce, Er, Tb, and Dy.

5. The permanent magnet according to claim 1, wherein 20 atomic % or less of the Co is replaced with at least one element selected from Ni, V, Cr, Mn, Al, Ga, Nb, Ta, and W.

6. A permanent magnet motor comprising the permanent magnet according to claim 1.

7. A generator comprising the permanent magnet according to claim 1.

8. The permanent magnet according to claim 2,
wherein the permanent magnet has coercive force of 300 kA/m or higher and residual magnetization of 1.19 T or higher.

9. The permanent magnet according to claim 1,
wherein z is a number (atomic ratio) satisfying $7.5 \leq z \leq 8.5$.

10. The permanent magnet according to claim 1,
wherein x is a number (atomic ratio) satisfying $0.2 \leq x \leq 0.4$.

11. The permanent magnet according to claim 1,
wherein p is a number (atomic ratio) satisfying $0.28 \leq p \leq 0.45$.

12. The permanent magnet according to claim 1,
wherein q is a number (atomic ratio) satisfying $0.015 \leq q \leq 0.04$.

13. The permanent magnet according to claim 1,
wherein r is a number (atomic ratio) satisfying $0.03 \leq r \leq 0.08$.

14. The permanent magnet according to claim 1,
wherein the ratio of $I_{(113)}$ to $I_{(300)}$ is in a range of $0.95 \leq I_{(113)}/I_{(300)} \leq 1.6$.

15. The permanent magnet according to claim 1,
wherein the ratio of $I_{(113)}$ to $I_{(300)}$ is in a range of $1 \leq I_{(113)}/I_{(300)} \leq 1.5$.

16. The permanent magnet according to claim 1,
wherein the permanent magnet is formed by a process comprising
press-forming a magnetic powder in a magnetic field to form a formed body,
sintering the formed body to form a sintered body,
solution treating the sintered body, and
aging the sintered body after the solution treatment.

17. The permanent magnet according to claim 16,
wherein the sintering is conducted at a temperature of from 1150-1250° C., and the solution treatment is conducted at a temperature of from 1130-1230° C.

* * * * *